(12) United States Patent
Ide et al.

(10) Patent No.: US 9,803,577 B2
(45) Date of Patent: Oct. 31, 2017

(54) METHOD AND APPARATUS FOR CONTROLLING INTERNAL COMBUSTION ENGINE

(71) Applicant: Toyota Jidosha Kabushiki Kaisha, Toyota-shi, Aichi-ken (JP)

(72) Inventors: Koji Ide, Gotenba (JP); Keiichiro Aoki, Shizuoka-ken (JP); Go Hayashita, Chigasaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 16 days.

(21) Appl. No.: 15/058,272

(22) Filed: Mar. 2, 2016

(65) Prior Publication Data
US 2016/0290267 A1 Oct. 6, 2016

(30) Foreign Application Priority Data
Mar. 30, 2015 (JP) ................................ 2015-069585

(51) Int. Cl.
*F02D 41/14* (2006.01)
*F02D 41/24* (2006.01)
(Continued)

(52) U.S. Cl.
CPC ..... *F02D 41/1494* (2013.01); *F02D 41/1454* (2013.01); *F02D 41/2403* (2013.01);
(Continued)

(58) Field of Classification Search
CPC ... F02D 41/1494; F02D 41/04; F02D 41/2403
(Continued)

(56) References Cited

U.S. PATENT DOCUMENTS

2008/0197022 A1 8/2008 Suzuki et al.
2011/0147211 A1* 6/2011 Inagaki ................ F02D 41/042
204/406
(Continued)

FOREIGN PATENT DOCUMENTS

| JP | 2003-148206 A | 5/2003 |
| JP | 2006118976 A | 5/2006 |

(Continued)

*Primary Examiner* — Mahmoud Gimie
(74) *Attorney, Agent, or Firm* — Dinsmore & Shohl LLP (57) ABSTRACT

In automatic stopping of the internal combustion engine, an electronic control unit controls a heater so that an element temperature of the air-fuel ratio sensor becomes a first temperature. The first temperature is a temperature that is below an activation temperature range in which the air-fuel ratio sensor is activated, and is also below a desorption temperature range in which HC components adsorbed on the air-fuel ratio sensor desorb therefrom. In a case where, after the element temperature of the air-fuel ratio sensor becomes the first temperature, it is estimated that the amount of HC components adsorbed on the air-fuel ratio sensor increases to exceed a first predetermined amount, the electronic control unit controls the heater so that the element temperature of the air-fuel ratio sensor becomes a second temperature. The second temperature is a temperature included in the desorption temperature range.

12 Claims, 4 Drawing Sheets

(51) Int. Cl.
  *F02D 41/40* (2006.01)
  *F02D 41/22* (2006.01)
  *F02B 77/08* (2006.01)

(52) U.S. Cl.
  CPC .......... *F02D 41/401* (2013.01); *F02B 77/086* (2013.01); *F02D 41/1495* (2013.01); *F02D 41/222* (2013.01); *Y02T 10/44* (2013.01)

(58) Field of Classification Search
  USPC ................. 701/112, 109; 123/697, 179.4
  See application file for complete search history.

(56) References Cited

U.S. PATENT DOCUMENTS

2011/0155113 A1\* 6/2011 Aoki ................ F02D 41/06
  123/672
2013/0006499 A1 1/2013 Date et al.

FOREIGN PATENT DOCUMENTS

| JP | 2008203101 A | 9/2008 |
| JP | 2010237000 A | 10/2010 |
| JP | 2013-011583 A | 1/2013 |
| WO | 2010041585 A1 | 4/2010 |

\* cited by examiner

Fig. 5

METHOD AND APPARATUS FOR CONTROLLING INTERNAL COMBUSTION ENGINE

CROSS-REFERENCE TO RELATED APPLICATIONS

This application claims priority to Japanese Patent Application No. 2015-069585, filed on Mar. 30, 2015, the entire contents of which are hereby incorporated by reference.

BACKGROUND

Field of the Application

The present application relates to a method and apparatus for controlling an internal combustion engine, and more particularly relates to a method and apparatus for controlling an internal combustion engine in which an air-fuel ratio sensor having a built-in heater is provided in an exhaust passage.

Background Art

JP2003-148206A discloses technology in which, during automatic stopping of an internal combustion engine, the element temperature of an air-fuel ratio sensor is maintained in the vicinity of a preheating temperature that is lower than the activation temperature by controlling a heater that is built into the air-fuel ratio sensor. According to this technology, the air-fuel ratio sensor is rapidly activated in restarting, while reducing the electric power consumption of the heater during automatic stopping.

SUMMARY OF THE APPLICATION

However, with the technology disclosed in JP2003-148206A, there is a concern that a cold shoot may arise in the sensor output when restarting from automatic stopping. The term "cold shoot" refers to a phenomenon whereby the sensor output deviates to a rich side during a process to warm up an air-fuel ratio sensor. A deviation arises in the sensor output when the atmosphere in the vicinity of the sensor element becomes a rich atmosphere as a result of HC components that remain in the exhaust passage adsorbing onto a diffusion-controlling layer and an electrode of the air-fuel ratio sensor, and the adsorbed HC components desorbing during the process of warming up the air-fuel ratio sensor. If the cold shoot phenomenon occurs, there is a concern that the cold shoot phenomenon will lead to a decrease in emissions performance and a decrease in drivability because it will be difficult to control the actual air-fuel ratio to be the target air-fuel ratio.

The present application addresses the above-described problem, and an object of the present application is to provide a method and apparatus for suppressing the occurrence of a cold shoot of a sensor output in restarting that is caused by HC components adsorbing on an air-fuel ratio sensor during automatic stopping of the internal combustion engine.

According to the present disclosure, a method for controlling an internal combustion engine comprises executing a first processing in automatic stopping of the internal combustion engine. The first processing is configured to control the heater so that a temperature of the air-fuel ratio sensor becomes a first temperature. The first temperature is a temperature that is below an activation temperature range in which the air-fuel ratio sensor is activated, and is also below a desorption temperature range in which HC components that are adsorbed on the air-fuel ratio sensor desorb therefrom.

The method further comprises executing a second processing in a case where, after the temperature of the air-fuel ratio sensor becomes the first temperature, it is estimated that an amount of HC components adsorbed on the air-fuel ratio sensor increases to exceed a first predetermined amount. The second processing is configured to control the heater so that the temperature of the air-fuel ratio sensor becomes a second temperature. The second temperature is a temperature that is included in the desorption temperature range in which HC components that are adsorbed on the air-fuel ratio sensor desorb therefrom, and is a higher temperature than the first temperature. In some embodiments, the second temperature is a temperature that is below the activation temperature range. The first predetermined amount may be an adsorption amount that is an upper limit at which a cold shoot of a sensor output that arises due to desorbed HC components falls within an allowable range in a case where HC components desorb from the air-fuel ratio sensor during a process of warming up the air-fuel ratio sensor. Estimation of an adsorption amount of HC components may be performed using, for example, an elapsed time period from execution of the first processing, or an elapsed time period from when the temperature of the air-fuel ratio sensor actually becomes the first temperature.

By execution of the first processing, the electric power consumption of the heater is reduced during automatic stopping of the internal combustion engine. Further, by execution of the second processing, because HC components that are adsorbed on the air-fuel ratio sensor are desorbed therefrom, the amount of HC components that desorb during a process to warm up the air-fuel ratio sensor when restarting the internal combustion engine is reduced. By this means, the occurrence of a cold shoot of the sensor output in restarting is suppressed. Further, since the second processing is not executed unless the amount of HC components adsorbed on the air-fuel ratio sensor exceeds a first predetermined amount, the frequency of raising the temperature of the air-fuel ratio sensor by means of the heater is lowered to thereby suppress electric power consumption.

The method according to the present disclosure may further comprise executing a third processing in a case where, after the temperature of the air-fuel ratio sensor becomes the second temperature, it is estimated that the amount of HC components adsorbed on the air-fuel ratio sensor decreases to below a second predetermined amount. The third processing is configured to control the heater so that the temperature of the air-fuel ratio sensor becomes a third temperature. The third temperature is a temperature that is below the activation temperature range in which the air-fuel ratio sensor is activated, and is also below the desorption temperature range in which HC components that are adsorbed on the air-fuel ratio sensor desorb therefrom. The third temperature may be equal to the first temperature. In some embodiments, a value for the second predetermined amount is a smaller value. In some embodiments, a value of the second predetermined amount is approximately zero Estimation of an adsorption amount of HC components may be performed using, for example, an elapsed time period from execution of the second processing, or an elapsed time period from when the temperature of the air-fuel ratio sensor actually becomes the second temperature.

By execution of the third processing, after HC components adsorbed on the air-fuel ratio sensor are desorbed therefrom, the temperature of the air-fuel ratio sensor is lowered to the third temperature that is lower than the second temperature. By this means, the electric power consumption is suppressed in comparison to when the temperature of the air-fuel ratio sensor is maintained at the second temperature.

The method according to the present disclosure may further comprise executing a fourth processing until restarting of the internal combustion engine is performed after the temperature of the air-fuel ratio sensor becomes the third temperature. The fourth processing is configured to control the heater so as to maintain the temperature of the air-fuel ratio sensor at a temperature that is below the desorption temperature range.

By execution of the fourth processing, electric power consumption is suppressed since the temperature of the air-fuel ratio sensor is not caused to rise until restarting of the internal combustion engine is performed. The amount of HC components that adsorb on the air-fuel ratio sensor again after HC components are desorbed from the air-fuel ratio sensor by executing the second processing is small. Therefore, the occurrence of a cold shoot of the sensor output in restarting is suppressed to a size of an ignorable level.

As described above, according to the method for controlling an internal combustion engine of the present disclosure, the occurrence of a cold shoot of a sensor output in restarting that is caused by HC components adsorbing on an air-fuel ratio sensor during automatic stopping of the internal combustion engine is suppressed.

The present disclosure provides an apparatus that comprises at least one processor and at least one memory including at least one computer program, the at least one memory and the at least one computer program configured, with the at least one processor, to cause the apparatus to perform the above described method.

The present disclosure provides an internal combustion engine that comprises an electronic control unit in communication with the air-fuel ratio sensor, the electronic control unit configured to perform the above described method.

DETAILED DESCRIPTION

Embodiments of the present disclosure are described hereunder with reference to the accompanying drawings. However, it is to be understood that even when the number, quantity, amount, range or other numerical attribute of an element is mentioned in the following description of the embodiments, the present disclosure is not limited to the mentioned numerical attribute unless it is expressly stated or theoretically defined. Further, structures, steps or the like described in conjunction with the following embodiments are not necessarily essential to the present disclosure unless expressly stated or theoretically defined.

First Embodiment

[Configuration of Engine System]

Figure 1:
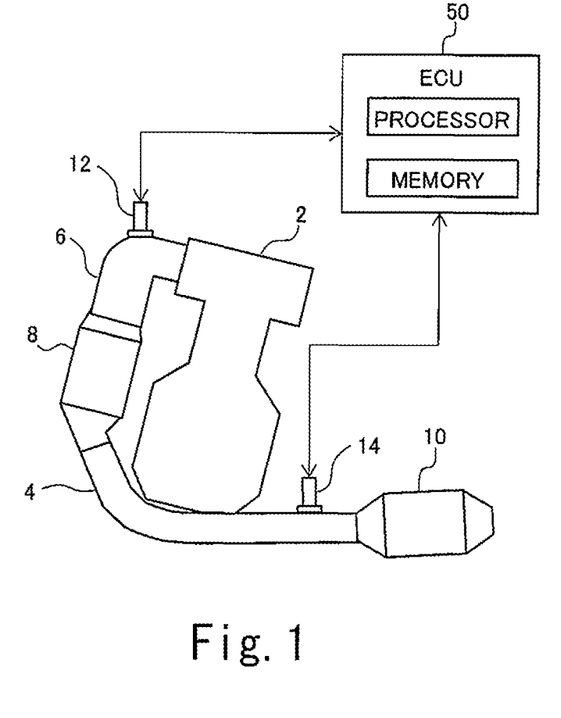
FIG. 1 is a view illustrating the configuration of an engine system.

FIG. 1 is a view illustrating the configuration of an engine system of an embodiment of the present disclosure. The system shown in FIG. 1 includes an internal combustion engine 2. The internal combustion engine 2 is a spark-ignition type engine, and is mounted in a vehicle and used as a power apparatus thereof. A first three-way catalyst 8 and a second three-way catalyst 10 are provided in series in an exhaust passage 4 of the internal combustion engine 2. The first three-way catalyst 8 is provided adjacent to an outlet of an exhaust manifold 6 that corresponds to the most upstream portion of the exhaust passage 4. The second three-way catalyst 10 is provided under the floor of the vehicle. A limiting-current type air-fuel ratio sensor 12 is installed upstream of the first three-way catalyst 8 in the exhaust passage 4. An electromotive force-type oxygen sensor 14 is installed between the first three-way catalyst 8 and the second three-way catalyst 10 in the exhaust passage 4.

The system shown in FIG. 1 includes an ECU (electronic control unit) 50. The ECU 50 includes at least an input/output interface, a ROM, a RAM and a CPU. The input/output interface is provided in order to take in sensor signals from various sensors including the air-fuel ratio sensor 12 and the oxygen sensor 14, and to also output actuating signals to various kinds of actuators and equipment that the internal combustion engine 2 includes. Various computer programs and maps for controlling the internal combustion engine 2 are stored in the ROM (memory). The CPU (processor) reads out a computer program from the ROM and executes the computer program, and generates actuating signals based on sensor signals that are taken in.

[Configuration of Air-Fuel Ratio Sensor]

Figure 2:
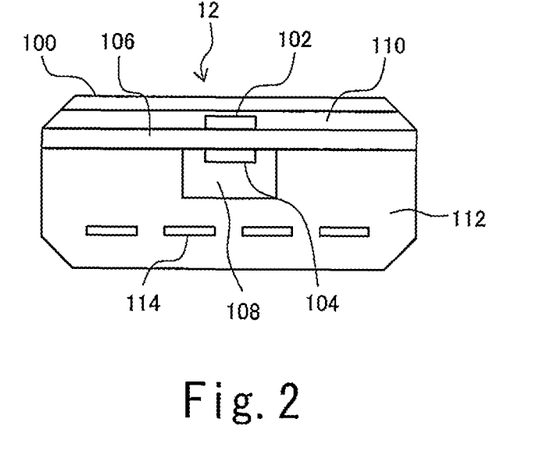
FIG. 2 is a cross-sectional view illustrating the configuration of an air-fuel ratio sensor.

FIG. 2 is a cross-sectional view illustrating the configuration of a sensor element 100 of the air-fuel ratio sensor 12. The air-fuel ratio sensor 12 has a configuration in which the sensor element 100 is disposed inside a double protective cover (not shown in the drawing). The sensor element 100 has a zirconia solid electrolyte layer 106. An exhaust-side electrode layer 102 that is made of a precious metal such as platinum is formed on one side of the zirconia solid electrolyte layer 106. The exhaust-side electrode layer 102 is covered by a diffusion-controlling layer 110 made of porous ceramic that is overlaid on the one side of the zirconia solid electrolyte layer 106. Exhaust gas that flows into the protective cover (not shown in the drawing) from the exhaust passage 4 passes through the diffusion-controlling layer 110 and arrives at the exhaust-side electrode layer 102. The other side of the zirconia solid electrolyte layer 106 is overlaid on an alumina substrate 112. An atmospheric chamber 108 into which atmospheric air is introduced is formed in a face of the alumina substrate 112 that contacts the zirconia solid electrolyte layer 106. An atmosphere-side electrode layer 104 made of a precious metal such as platinum is formed on the side of the zirconia solid electrolyte layer 106 that is opened to the atmospheric chamber 108. A heater 114 for heating and controlling the temperature of the zirconia solid electrolyte layer 106, the exhaust-side electrode layer 102, and the atmosphere-side electrode layer 104 is built into the alumina substrate 112.

[Heater Energization Control for Air-Fuel Ratio Sensor]

The computer programs executed by the ECU 50 include a computer program for controlling energization to the heater 114 of the air-fuel ratio sensor 12 (hereunder, control by this computer program is referred to as "heater energization control"). In the heater energization control, feedback control is performed with respect to the electric power of the heater so that the temperature of the sensor element 100 of the air-fuel ratio sensor 12 (hereunder, referred to as "element temperature") becomes a target element temperature. However, although it is also possible to directly measure the element temperature, in this case the impedance of the sensor element 100 (hereunder, referred to as "element impedance") that has a correlation with the element temperature is measured as an alternative physical quantity of the element temperature. That is, according to the heater energization control, more specifically, feedback control is performed with respect to the electric power of the heater so that a measurement value of the element impedance that corresponds to the element temperature becomes an impedance value that corresponds to a target element temperature.

The target element temperature that is used in the heater energization control is set by means of a target element temperature setting routine that is included in the computer program. The target element temperature setting routine is represented by a flowchart shown in FIG. 3. Hereunder, a flow of processing for setting the target element temperature will be described referring to FIG. 3. Note that, the target element temperature setting routine is repeatedly executed at predetermined control periods by the ECU 50 after startup of the internal combustion engine 2.

Figure 3:
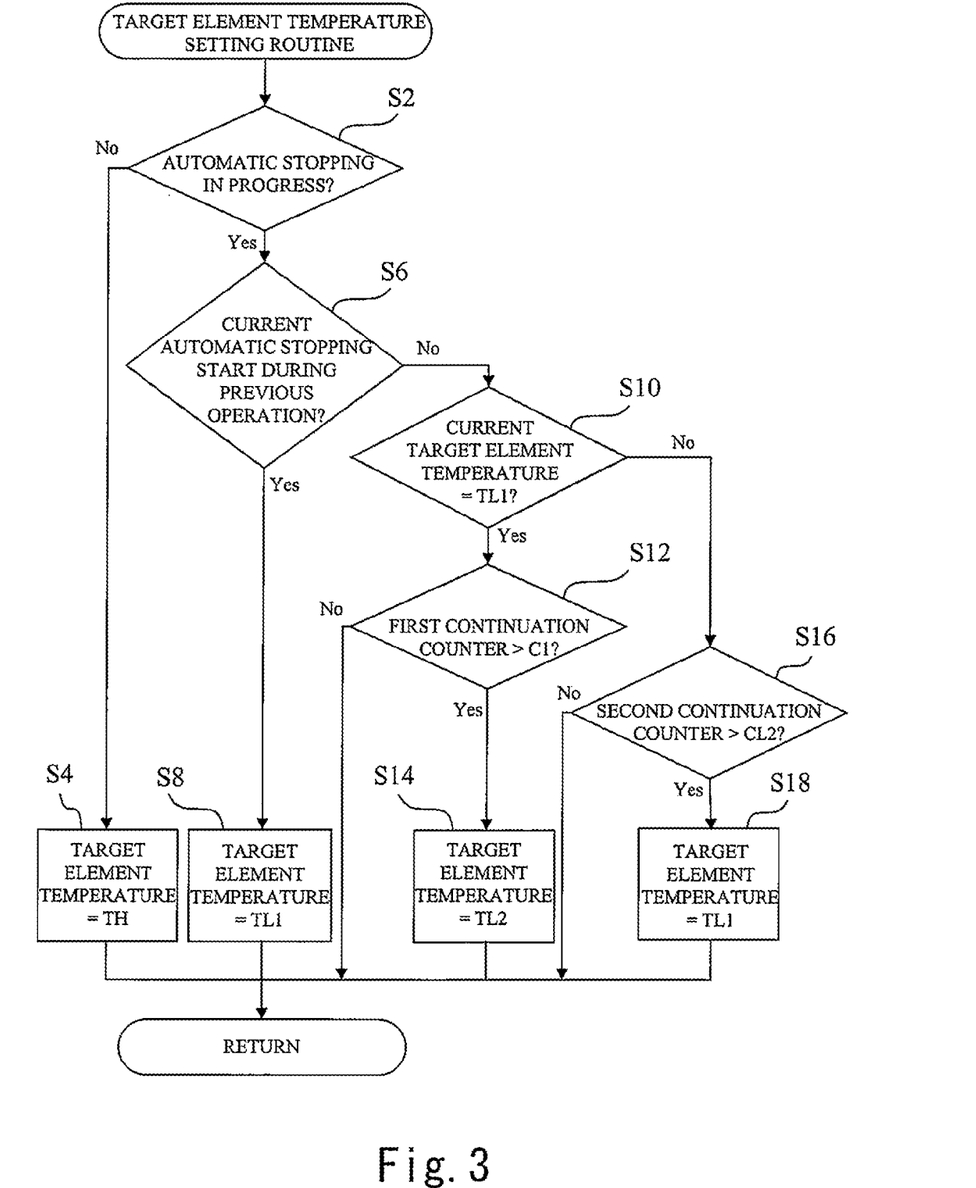
FIG. 3 is a flowchart illustrating a target element temperature setting routine according to heater energization control of a first embodiment.

Upon starting the target element temperature setting routine, first, in step S2, the ECU 50 determines whether the internal combustion engine 2 is currently being automatically stopped. Apart from the computer program for heater energization control, the ECU 50 executes a computer program for automatic stopping control that automatically stops the internal combustion engine 2. According to the automatic stopping control, automatic stopping of the internal combustion engine 2 is performed at a time that the accelerator pedal is not being depressed, the brake pedal is depressed, and the vehicle is in a stopped state or a state that is close to a stopped state. Subsequently, when any one of the foregoing three conditions is no longer satisfied, automatic stopping is terminated and restarting of the internal combustion engine 2 is performed.

If the internal combustion engine 2 is operating, the processing proceeds to step S4. In step S4, the ECU 50 sets the target element temperature to a high target temperature TH that is read in from the ROM. The high target temperature TH is a temperature included in an activation temperature range that is a range of temperatures at which the sensor element 100 of the air-fuel ratio sensor 12 is activated. A fixed value (for example, a temperature of around 700° C.) is stored as the high target temperature TH in the ROM.

If the internal combustion engine 2 is currently being automatically stopped, the processing proceeds to step S6 in which the ECU 50 determines whether or not the internal combustion engine 2 had been operating at the time of the previous execution of the present routine, that is, the ECU 50 determines whether or not the automatic stopping of the internal combustion engine 2 started from the current execution of the present routine.

If the automatic stopping of the internal combustion engine 2 started from the current execution of the present routine, the processing proceeds to step S8. In step S8, the ECU 50 sets the target element temperature to a first low target temperature TL1 that is read in from the ROM. The first low target temperature TL1 is a temperature that is included in a temperature range that is lower than the activation temperature range of the sensor element 100 and is also lower than a desorption temperature range at which HC components adsorbed on the sensor element 100 desorb therefrom, and is stored as a fixed value (for example, a temperature of around 300° C.) in the ROM. Note that, adsorption of HC components occurs in the diffusion-controlling layer 110 and the exhaust-side electrode layer 102 through which exhaust gas flows. Adsorption/desorption of HC components onto/from the sensor element 100 depends on the element temperature. Adsorption of HC components proceeds in a temperature range lower than approximately 400° C., and desorption of adsorbed HC components proceeds in a temperature range that is higher than the aforementioned temperature range. A predetermined temperature (for example, a temperature around 400° C.) in the vicinity of a boundary between the temperature range in which adsorption of HC components is dominant and the temperature range in which desorption is dominant is stored as the threshold temperature TS. The processing in the present step S8 corresponds to "first processing", and the first low target temperature TL1 corresponds to "first temperature".

If the automatic stopping of the internal combustion engine 2 is being continued from since the previous execution of the present routine, the processing proceeds to step S10. In step S10, the ECU 50 determines whether or not the target element temperature that is currently set is the first low target temperature TL1.

If the target element temperature is currently set to the first low target temperature TL1, the processing proceeds to step S12. In a case where the target element temperature is set to the first low target temperature TL1, because the first low target temperature TL1 is lower than the threshold temperature TS, the element temperature decreases to less than the threshold temperature TS as a result of the feedback control for the electric power of the heater. Since the threshold temperature TS is the boundary between the temperature range in which adsorption of HC components becomes dominant and the temperature range in which desorption of adsorbed HC components becomes dominant, if the element temperature is lower than the threshold temperature TS, adsorption of HC components onto the sensor element 100 proceeds. The longer that a state in which the element temperature is lower than the threshold temperature TS continues, the greater that the increase will be in the amount of HC components adsorbed on the sensor element 100. The larger that the adsorption amount of HC components on the sensor element 100 becomes, the greater the degree to which the occurrence of a cold shoot of the sensor output that arises in the process to warm up the air-fuel ratio sensor 12 is facilitated when restarting the internal combustion engine 2. In a separate routine to the present routine, the ECU 50 compares the element temperature and the threshold temperature TS (specifically, compares a measurement value of the element impedance and an impedance value corresponding to the threshold temperature TS), and if the element temperature becomes lower than the threshold temperature TS, the ECU 50 starts to measure the elapsed time period from a time that the element temperature becomes lower than the threshold temperature TS. Measurement of the elapsed time period is, specifically, performed by incrementing a value of a counter (first continuation counter) by a fixed amount for each control period. The value of the first continuation counter represents a continuation time period in a state in which the element temperature is lower than the threshold temperature TS.

In step S12, the ECU 50 determines whether or not the continuation time period indicated by the value of the first continuation counter exceeds a first predetermined time period C1. The first predetermined time period C1 is set to a time period in which it is estimated that the adsorption amount of HC components reaches a first predetermined amount. The term "first predetermined amount" refers to an adsorption amount that is an upper limit at which the size of a cold shoot falls within an allowable range in a case where the cold shoot arises during the process of warming up the air-fuel ratio sensor 12. The length of time of the first predetermined time period C1 is changed in accordance with an operating condition, for example, the engine water temperature, of the internal combustion engine 2 immediately before the internal combustion engine 2 is automatically stopped. In a case where the engine water temperature is low, that is, a case where the internal combustion engine 2 is not sufficiently warmed up, the concentration of HC components in exhaust gas will increase because the combustion state will be unstable. Consequently, in a case where the engine water temperature is low, the length of time of the first predetermined time period C1 is set to a shorter time in comparison to when the engine water temperature is high. Further, if the engine system of the present embodiment is a hybrid system that operates and stops the internal combustion engine 2 in accordance with an operating condition, the length of time of the first predetermined time period C1 may be changed depending on the engine speed and load of the internal combustion engine 2 immediately before automatic stopping. The reason is that the amount of HC components remaining in the exhaust passage 4 differs depending on the operating state immediately before stopping. In any case, the first predetermined time period C1 is determined by adaptation, and adaptive values thereof are stored in the ROM.

In a case where a state in which the element temperature is lower than the threshold temperature TS does not continue for a time period that exceeds the first predetermined time period C1, the ECU 50 maintains the target element temperature at the first low target temperature TL1. If the target element temperature is low, the electric power applied to the heater 114 decreases, and hence electric power consumption is suppressed by maintaining the target element temperature at a low temperature. Note that, although the electric power consumption is decreased as the target element temperature becomes lower, if the element temperature is lowered too much, it will require time to reactive the sensor element 100 when restarting the internal combustion engine 2. That is, the responsiveness at the time of restarting of the air-fuel ratio sensor 12 will decrease. Although the time required until reactivation is shortened by raising the amount of electric power supplied to the heater 114, there is a risk of causing cracking in the sensor element 100 if the rate of temperature increase is too high. In addition, if the element temperature is too low, there is also a risk of condensed water attaching to the sensor element 100. For such reasons, the first low target temperature TL1 is set to a temperature at which, when restarting the internal combustion engine 2, the element temperature is rapidly raised to the activation temperature and at which there is no attachment of condensed water to the sensor element 100.

If a state in which the element temperature is lower than the threshold temperature TS continues for a time period that exceeds the first predetermined time period C1, the processing proceeds to step S14. In step S14, the ECU 50 changes the target element temperature from the first low target temperature TL1 to the second low target temperature TL2. The second low target temperature TL2 is a temperature that is included in a temperature range that is higher than the threshold temperature TS and lower than the high target temperature TH, and is stored as a fixed value (for example, a temperature around 550° C.) in the ROM. The processing from step S12 to step S14 corresponds to "second processing", and the second low target temperature TL2 corresponds to "second temperature".

By changing the target element temperature from the first low target temperature TL1 to the second low target temperature TL2, the determination result in step S10 in the next execution of the present routine will be negative.

If the target element temperature is currently set to the second low target temperature TL2, the processing proceeds to step S16. In a case where the target element temperature is set to the second low target temperature TL2, because the second low target temperature TL2 is higher than the threshold temperature TS, the element temperature increases to a temperature that is higher than the threshold temperature TS as a result of the feedback control for the electric power of the heater. In a case where the element temperature is higher than the threshold temperature TS, desorption of HC components adsorbed on the sensor element 100 proceeds. The longer that a state in which the element temperature is higher than the threshold temperature TS continues, the more that the amount of HC components that desorb from the sensor element 100 will increase. The greater the degree to which the adsorption amount of HC components decreases due to desorption, the greater the degree to which the occurrence of a cold shoot of the sensor output that occurs in the process to warm up the air-fuel ratio sensor 12 when restarting the internal combustion engine 2 is suppressed. In a separate routine to the present routine, the ECU 50 compares the element temperature and the threshold temperature TS, and if the element temperature becomes higher than the threshold temperature TS, the ECU 50 starts to measure the elapsed time period from a time that the element temperature becomes higher than the threshold temperature TS. Specifically, measurement of the elapsed time period is performed by incrementing a value of a counter (second continuation counter) by a fixed amount for each control period. The value of the second continuation counter represents a continuation time period in a state in which the element temperature is higher than the threshold temperature TS.

In step S16, the ECU 50 determines whether or not the continuation time period indicated by the value of the second continuation counter exceeds a second predetermined time period C2. The second predetermined time period C2 is set to a time period in which it is estimated that the adsorption amount of HC components decreases to a second predetermined amount. The second predetermined amount is an amount of HC components that is allowed to remain adsorbed on the sensor element 100. The second predetermined amount is set to zero in the present embodiment. That is, the length of time of the second predetermined time period C2 is set to a length of time in which approximately all HC components that are adsorbed on the sensor element 100 will be desorbed therefrom. However, although the longer that the length of time the second predetermined time period C2 is set to is, the more reliably all HC components will be desorbed, on the other hand, the longer that the second predetermined time period C2 is, the greater the increase will be in the electric power consumption. Therefore, in some embodiments, the length of time of the second predetermined time period C2 is the shortest length of time in which approximately all of the HC components will be desorbed. The second predetermined time period C2 is determined by adaptation, and adaptive values thereof are stored in the ROM.

If a state in which the element temperature is higher than the threshold temperature TS has not continued for a time period that exceeds the second predetermined time period C2, the ECU 50 maintains the target element temperature at the second low target temperature TL2 to continue desorption of HC components from the sensor element 100. Note that, the higher the value that the second low target temperature TL2 is set to, the greater the degree to which desorption of HC components that are adsorbed to the sensor element 100 will be promoted, and the second predetermined time period C2 may be set to a shorter time. However, comparing an increase in electric power consumption that is caused by raising the second low target temperature TL2, and an effect of decreasing the electric power consumption by shortening the second predetermined time period C2, as described above, in some embodiments the second low target temperature TL2 is a temperature that is included in a temperature range that is lower than the high target temperature TH, that is, a temperature range that is below an activation temperature range in which the air-fuel ratio sensor 12 is activated.

If a state in which the element temperature is higher than the threshold temperature TS continues for a time period that exceeds the second predetermined time period C2, the processing proceeds to step S18. In step S18, the ECU 50 changes the target element temperature again from the second low target temperature TL2 to the first low target temperature TL1. By lowering the target element temperature, the electric power consumption of the heater 114 is suppressed. In this case, the processing from step S16 to step S18 corresponds to "third processing", and the first low target temperature TL1 corresponds to "third temperature". Note that, as long as the target element temperature after the change (that is, the "third temperature") is a temperature included in a temperature range that is lower than the threshold temperature TS, the target element temperature after the change need not necessarily be the same as the first low target temperature TL1. However, from the viewpoint of reducing the electric power consumption and also the responsiveness when restarting, some embodiments use the first low target temperature TL1 as the target element temperature after the change.

The next time the present routine is executed, unless automatic stopping of the internal combustion engine 2 has been terminated, the processing proceeds to step S10 again, and the ECU 50 determines whether or not the target element temperature is the first low target temperature TL1. As a result of the target element temperature being changed from the second low target temperature TL2 to the first low target temperature TL1 in step S18 this time, the result that is determined in step S10 the next time that the present routine is executed will be affirmative and the processing will proceed to step S12. Thereafter, until the automatic stopping of the internal combustion engine 2 is terminated, the processing for switching the target element temperature from the first low target temperature TL1 to the second low target temperature TL2 that is composed of steps S12 and S14, and the processing for switching the target element temperature from the second low target temperature TL2 to the first low target temperature TL1 that is composed of steps S16 and S18 are alternately repeated and executed.

When the automatic stopping is terminated and restarting of the internal combustion engine 2 is performed in due course, the result determined in step S2 is negative, and the processing proceeds to step S4. In step S4, the ECU 50 switches the target element temperature from the first low target temperature TL1 or the second low target temperature TL2 to the high target temperature TH. The element temperature rises to the high target temperature TH by means of the feedback control for the electric power of the heater, and the sensor element 100 is activated and measurement of the air-fuel ratio by the air-fuel ratio sensor 12 is enabled.

At this time, if HC components that are adsorbed on the sensor element 100 desorb therefrom during the process to warm up the air-fuel ratio sensor 12, the atmosphere in the vicinity of the sensor element 100 becomes a rich atmosphere and a deviation arises in the sensor output. However, according to the heater energization control of the present embodiment that includes the above-described target element temperature setting routine, because HC components that adsorb on the sensor element 100 is desorbed during automatic stopping of the internal combustion engine 2, the amount of HC components that desorb during the warming-up process is reduced. By this means, the occurrence of a cold shoot of the sensor output during restarting that is a problem in the conventional technology is suppressed.

[Execution Example of Heater Energization Control]

Figure 4:
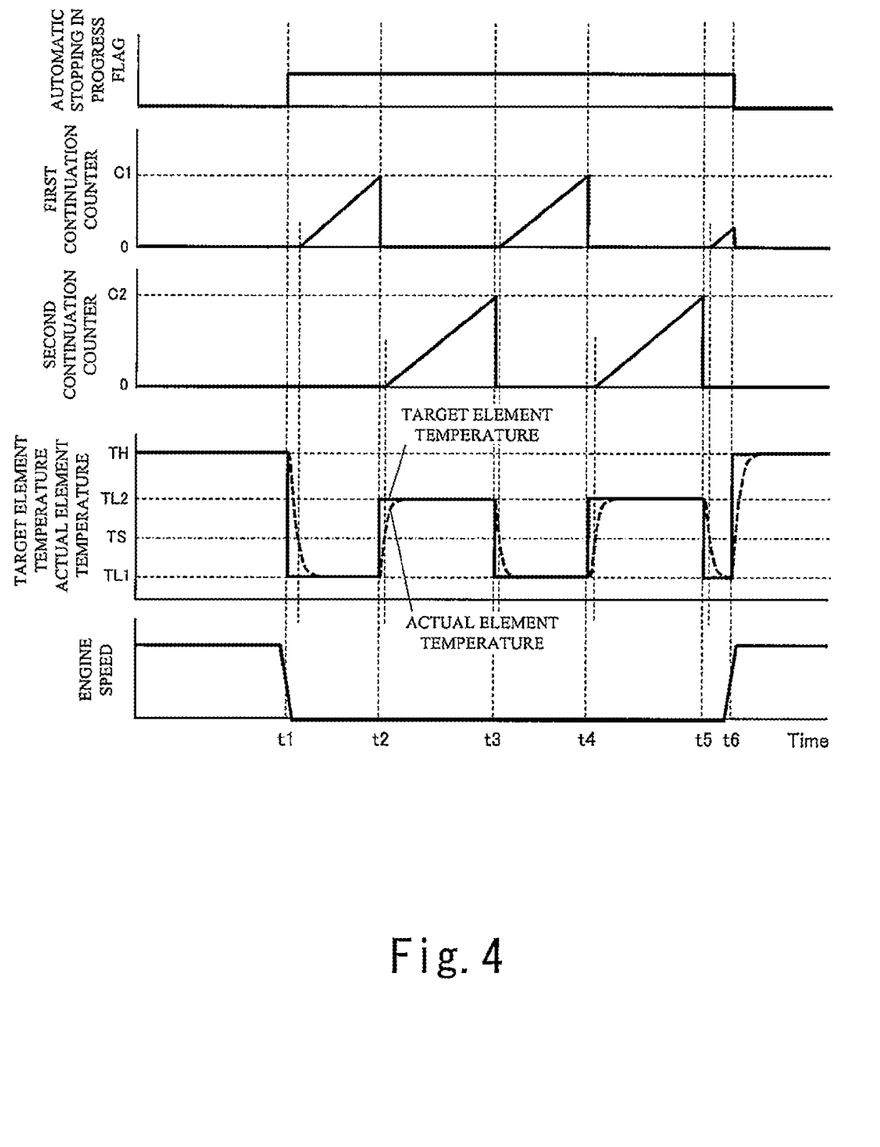
FIG. 4 is a time chart illustrating an execution example of the heater energization control of the first embodiment.

FIG. 4 is a time chart illustrating an example of execution of heater energization control in the first embodiment. In the time chart, changes over time in the element temperature of the air-fuel ratio sensor 12 in a case where the above-described target element temperature setting routine is executed are illustrated. Specifically, a chart on the first (upper) level shows the status of an automatic stopping in progress flag that indicates whether or not the internal combustion engine 2 is currently in an automatically stopped state. A chart on the second level shows the value of the first continuation counter. A chart on the third level shows the value of the second continuation counter. A chart on the fourth level shows the target element temperature that is set with the target element temperature setting routine, and the actual element temperature of the air-fuel ratio sensor 12 (actual element temperature). A chart on the fifth level shows the engine speed.

According to the example shown in the time chart, at a time t1 during a period in which the engine speed is decreasing because of a deceleration operation by the driver, the automatic stopping in progress flag is set to "on". While the internal combustion engine 2 is operating, the target element temperature is set to the high target temperature TH at which the air-fuel ratio sensor 12 is maintained in an active state. Upon the automatic stopping in progress flag being set to "on", the target element temperature is switched from the high target temperature TH to the first low target temperature TL1. When the target element temperature is switched to the first low target temperature TL1, the actual element temperature decreases to track the target element temperature by means of feedback control for the electric power of the heater.

The first continuation counter starts to count the time from a time that the actual element temperature falls below the threshold temperature TS. Subsequently, at a time t2 at which a continuation time period indicated by the value of the first continuation counter exceeds the first predetermined time period C1, the target element temperature is switched from the first low target temperature TL1 to the second low target temperature TL2. At this time, the value of the first continuation counter is reset and returns to zero. When the target element temperature is switched to the second low target temperature TL2, the actual element temperature rises to track the target element temperature as a result of the feedback control for the electric power of the heater.

The second continuation counter starts to count the time from a time that the actual element temperature exceeds the threshold temperature TS. Subsequently, at a time t3 at which a continuation time period indicated by the value of the second continuation counter exceeds the second predetermined time period C2, the target element temperature is switched from the second low target temperature TL2 to the first low target temperature TL1. At this time, the value of the second continuation counter is reset and returns to zero. When the target element temperature is switched to the first low target temperature TL1, the actual element temperature falls to track the target element temperature.

The first continuation counter again starts to count the time from a time that the actual element temperature falls below the threshold temperature TS. According to the example illustrated in the time chart, thereafter, switching of the target element temperature to the second low target temperature TL2 is performed at a time t4, and switching of the target element temperature to the first low target temperature TL1 is performed at a time t5. During this period, increasing and decreasing of the actual element temperature between a temperature range that is lower than the threshold temperature TS and a temperature range that is higher than the threshold temperature TS is repeated so as to track the target element temperature by means of feedback control for the electric power of the heater.

According to the example illustrated in the time chart, the engine speed starts to increase after the target element temperature is switched to the first low target temperature TL1 at the time t5, and the automatic stopping in progress flag is set to "off" at a time t6 during the course of the engine speed increasing. Upon the automatic stopping in progress flag being set to "off", the target element temperature is switched from the first low target temperature TL1 to the high target temperature TH. When the target element temperature is switched to the high target temperature TH, the actual element temperature increases to track the target element temperature by means of the feedback control for the electric power of the heater, and increases as far as the high target temperature TH that is the activation temperature of the sensor element 100. By this means, measurement of the air-fuel ratio by the air-fuel ratio sensor 12 is again enabled.

Note that, in the example illustrated in the time chart, the automatic stopping in progress flag is set to "off" after an operation to desorb HC components by switching the target element temperature from the first low target temperature TL1 to the second low target temperature TL2 is performed twice. However, because the timing at which the automatic stopping in progress flag is set to "off" depends on the circumstances, it is also possible for a case to arise in which the automatic stopping in progress flag is set to "off" during an operation to desorb HC components or before an operation to desorb HC components is performed. According to the heater energization control of the present embodiment, since the adsorption amount of HC components is managed so that a cold shoot that exceeds an allowable level does not occur, regardless of the timing at which the internal combustion engine 2 is restarted, the occurrence of a cold shoot of the sensor output is suppressed.

Second Embodiment

In the above-described first embodiment, during a period in which automatic stopping of the internal combustion engine 2 is being continued, processing that suppresses the electric power consumption by making the element temperature lower than the threshold temperature TS and processing that desorbs HC components from the air-fuel ratio sensor 12 by making the element temperature higher than the threshold temperature TS are repeatedly executed alternatively. As a result, electric power consumption that is caused by energization to the heater 114 is suppressed while reliably preventing the adsorption amount of HC components from increasing to an amount at which a cold shoot that exceeds an allowable level occurs.

On the other hand, in a case where the processing (second processing) that desorbs HC components from the air-fuel ratio sensor 12 by making the element temperature higher than the threshold temperature TS is executed once, it is considered that even if the element temperature becomes lower than the threshold temperature TS, the amount of HC components that adsorb on the air-fuel ratio sensor 12 again will be small. According to this idea, after the element temperature is increased from the first low target temperature TL1 to the second low target temperature TL2 and is then decreased again from the second low target temperature TL2 to the first low target temperature TL1, the element temperature may be maintained as it is at the first low target temperature TL1, and thus the electric power consumption is further suppressed.

Figure 5:
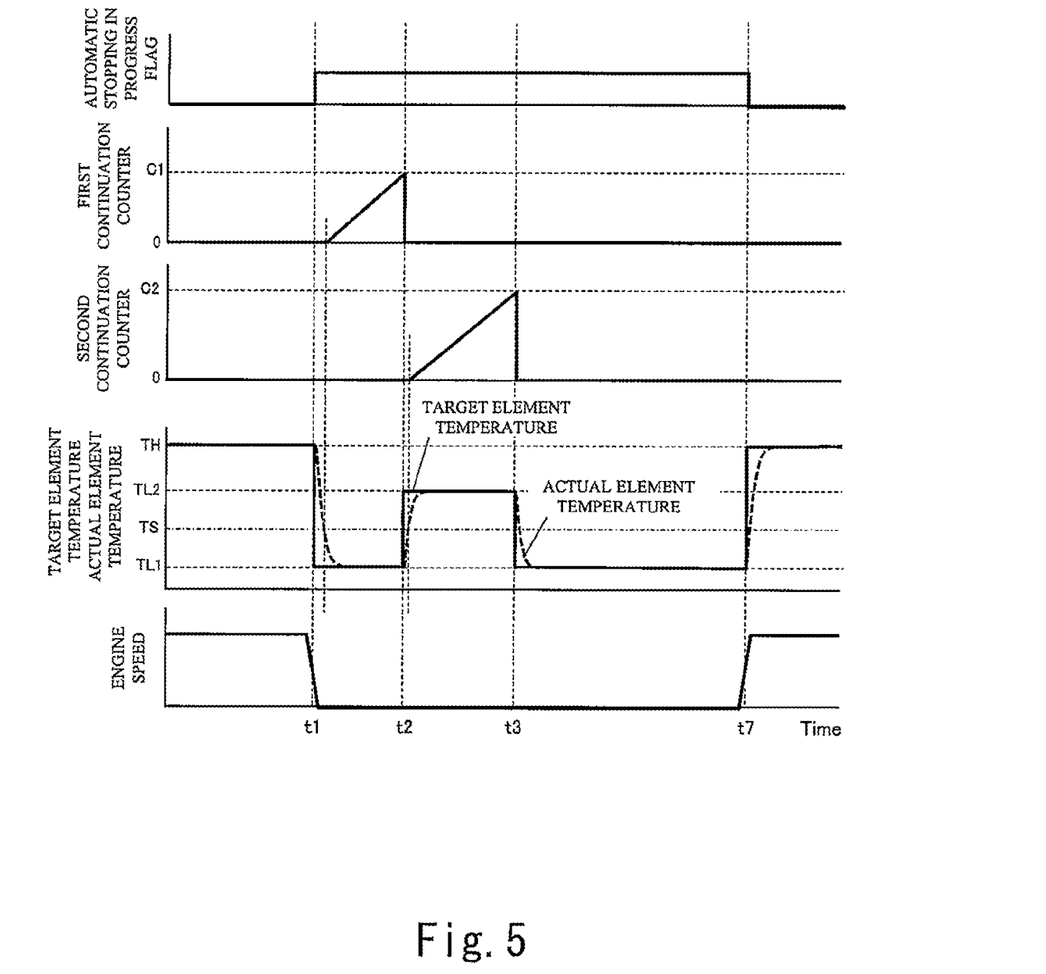
FIG. 5 is a time chart illustrating an execution example of the heater energization control of a second embodiment.

FIG. 5 is a time chart that illustrates an example of execution of heater energization control according to the second embodiment. The items illustrated in the respective charts from the first (upper) level to the fifth level in FIG. 5 are the same as the items illustrated in the time chart in FIG. 4. According to the example illustrated in this time chart, at a time t3, a continuation time period indicated by the value of the second continuation counter exceeds the second predetermined time period C2 and the target element temperature is thus switched from the second low target temperature TL2 to the first low target temperature TL1, and from that time onwards neither counting by the first continuation counter nor counting by the second continuation counter is performed and the target element temperature is maintained at the first low target temperature TL1. Thereafter, the actual element temperature is maintained in the vicinity of the first low target temperature TL1 until the automatic stopping in progress flag is set to "off" at a time t7 and the target element temperature is switched from the first low target temperature TL1 to the high target temperature TH. The foregoing processing corresponds to "fourth processing".

Upon the target element temperature being switched to the high target temperature TH, the actual element temperature rises to track the target element temperature by means of the feedback control for the electric power of the heater, and rises as far as the high target temperature TH that is the activation temperature of the sensor element 100. At this time, although HC components that readsorbed onto the sensor element 100 from the time t3 onwards desorb therefrom, the absolute amount of the desorbed HC components is not large. Consequently, even if a cold shoot occurs accompanying desorption of HC components, the size thereof is suppressed to an ignorable level.

The invention claimed is:

1. A method for controlling an internal combustion engine in which an air-fuel ratio sensor having a built-in heater is provided in an exhaust passage, comprising:
   executing a first processing in automatic stopping of the internal combustion engine, the first processing configured to control the heater so that an element temperature of the air-fuel ratio sensor becomes a first temperature that is below an activation temperature range in which the air-fuel ratio sensor is activated and is also below a desorption temperature range in which HC components that are adsorbed on the air-fuel ratio sensor desorb therefrom; and
   executing a second processing in the automatic stopping of the internal combustion engine in a case where, after the element temperature of the air-fuel ratio sensor becomes the first temperature, it is estimated that an amount of HC components adsorbed on the air-fuel ratio sensor increases to exceed a first predetermined amount, the second processing configured to control the heater so that the element temperature of the air-fuel ratio sensor becomes a second temperature that is included in the desorption temperature range.

2. The method according to claim 1, wherein the second temperature is below the activation temperature range.

3. The method according to claim 1, further comprising: executing a third processing in a case where, after the element temperature of the air-fuel ratio sensor becomes the second temperature, it is estimated that an amount of HC components adsorbed on the air-fuel ratio sensor decreases to less than a second predetermined amount, the third processing configured to control the heater so that the element temperature of the air-fuel ratio sensor becomes a third temperature that is below the activation temperature range and is also below the desorption temperature range.

4. The method according to claim 3, further comprising: executing a fourth processing until restarting of the internal combustion engine after the element temperature of the air-fuel ratio sensor becomes the third temperature, the fourth processing configured to control the heater so that the element temperature of the air-fuel ratio sensor is maintained at a temperature that is below the desorption temperature range.

5. An apparatus for controlling an internal combustion engine in which an air-fuel ratio sensor having a built-in heater is provided in an exhaust passage, comprising:
at least one processor; and
at least one memory including at least one computer program, the at least one memory and the at least one computer program configured, with the at least one processor, to cause the apparatus at least to
execute a first processing in automatic stopping of the internal combustion engine, the first processing configured to control the heater so that an element temperature of the air-fuel ratio sensor becomes a first temperature that is below an activation temperature range in which the air-fuel ratio sensor is activated and is also below a desorption temperature range in which HC components that are adsorbed on the air-fuel ratio sensor desorb therefrom, and
execute a second processing in the automatic stopping of the internal combustion engine in a case where, after the element temperature of the air-fuel ratio sensor becomes the first temperature, it is estimated that an amount of HC components adsorbed on the air-fuel ratio sensor increases to exceed a first predetermined amount, the second processing configured to control the heater so that the element temperature of the air-fuel ratio sensor becomes a second temperature that is included in the desorption temperature range.

6. The apparatus according to claim 5, wherein the second temperature is below the activation temperature range.

7. The apparatus according to claim 5, wherein the apparatus is further caused to execute a third processing in a case where, after the element temperature of the air-fuel ratio sensor becomes the second temperature, it is estimated that an amount of HC components adsorbed on the air-fuel ratio sensor decreases to less than a second predetermined amount, the third processing configured to control the heater so that the element temperature of the air-fuel ratio sensor becomes a third temperature that is below the activation temperature range and is also below the desorption temperature range.

8. The apparatus according to claim 7, wherein the apparatus is further caused to execute a fourth processing until restarting of the internal combustion engine after the element temperature of the air-fuel ratio sensor becomes the third temperature, the fourth processing configured to control the heater so that the element temperature of the air-fuel ratio sensor is maintained at a temperature that is below the desorption temperature range.

9. An internal combustion engine in which an air-fuel ratio sensor having a built-in heater is provided in an exhaust passage, comprising:
an electronic control unit in communication with the air-fuel ratio sensor, the electronic control unit configured to
execute a first processing in automatic stopping of the internal combustion engine, the first processing configured to control the heater so that an element temperature of the air-fuel ratio sensor becomes a first temperature that is below an activation temperature range in which the air-fuel ratio sensor is activated and is also below a desorption temperature range in which HC components that are adsorbed on the air-fuel ratio sensor desorb therefrom, and
execute a second processing in the automatic stopping of the internal combustion engine in a case where, after the element temperature of the air-fuel ratio sensor becomes the first temperature, it is estimated that an amount of HC components adsorbed on the air-fuel ratio sensor increases to exceed a first predetermined amount, the second processing configured to control the heater so that the element temperature of the air-fuel ratio sensor becomes a second temperature that is included in the desorption temperature range.

10. The internal combustion engine according to claim 9, wherein the second temperature is below the activation temperature range.

11. The internal combustion engine according to claim 9, wherein the electronic control unit is further configured to execute a third processing in a case where, after the element temperature of the air-fuel ratio sensor becomes the second temperature, it is estimated that an amount of HC components adsorbed on the air-fuel ratio sensor decreases to less than a second predetermined amount, the third processing configured to control the heater so that the element temperature of the air-fuel ratio sensor becomes a third temperature that is below the activation temperature range and is also below the desorption temperature range.

12. The internal combustion engine according to claim 11, wherein the electronic control unit is further configured to execute a fourth processing until restarting of the internal combustion engine after the element temperature of the air-fuel ratio sensor becomes the third temperature, the fourth processing configured to control the heater so that the element temperature of the air-fuel ratio sensor is maintained at a temperature that is below the desorption temperature range.

* * * * *